Sept. 6, 1927.
N. A. CHRISTENSEN
AIR BRAKE COUPLING
Filed Sept. 28, 1925
1,641,919
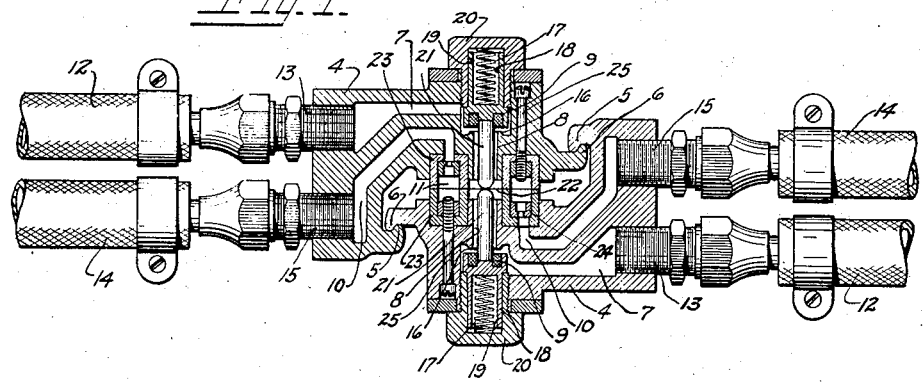
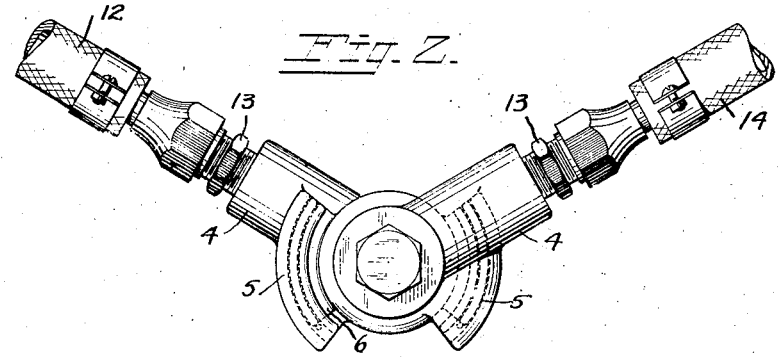
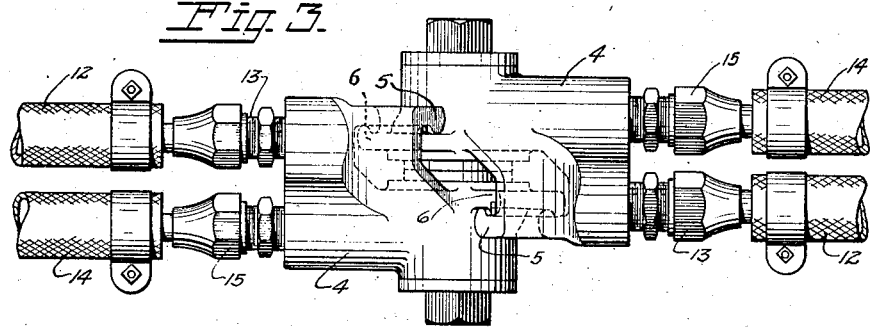
INVENTOR.
Niels A. Christensen
BY
Drucker & French
ATTORNEYS Patented Sept. 6, 1927.

1,641,919

UNITED STATES PATENT OFFICE.

NIELS A. CHRISTENSEN, OF MILWAUKEE, WISCONSIN.

AIR-BRAKE COUPLING.

Application filed September 28, 1925. Serial No. 59,117.

The invention relates to air brake couplings.

One object of the invention is to provide a coupling for air hose in which a pair of pipes are simultaneously coupled together.

A further object of the invention is to provide a coupling for air hose in which a pair of pipes are simultaneously coupled together and each of the coupling members is provided with an automatic shut-off valve, for one of the pipe conduits, which valves are automatically opened when the couplings are hooked together.

The invention further consists in the several features hereinafter set forth and more particularly defined by claims at the conclusion hereof.

In the drawings Fig. 1 is a vertical sectional view through a device embodying the invention before the parts are fully coupled together.

Fig. 2 is a bottom plan view thereof;

Fig. 3 is a side elevation view thereof before the parts are fully coupled together.

The coupling consists of two complementary interlockable coupling members 4 with the usual cam projections 5 and 6 of one interlocking with the projections 6 and 5 of the other. Each of these members have communicating passages 7 and 8 with a shut-off valve 9 between said passages, and a passage 10 communicating with an annular space 11. A pipe 12 is coupled to each of the members 4 by a coupling 13 communicating with the passage 7, and a pipe 14 is also coupled to each member by a coupling 15 communicating with the passage 10.

Each valve 9 is urged to its seat 16 by a spring 17 mounted in the tubular stem 18 of the valve and in the bore 19 of a box-nut 20. Each valve 9 has an extension pin 21 engageable with a similar pin on the other valve to hold both valves open when the coupling members 4 are hooked together. The annular space 11 and a central passage 22 alined with the passages 8 are formed by abutting complementary channel-shaped flexible packing rings 23, each held to its coupling member by a channel-shaped metal ring 24 and bolts 25 mounted in each coupling member and having threaded engagement with the web portion of each ring 24.

With this construction, when the members 4 are coupled together the pipes 12 will communicate with each other through the passages 7, 8 and 22, the valves 9 being then open, and the pipes 14 will communicate with each other through the passages 10 and the space 11. When the coupling members 4 are disengaged the valves 9 close off the ends of the pipes 12 by closing off the passage 7. In my application Serial No. 47,506, filed August 1st, 1925, the pipes 12, with the coupling, form a release pipe while the pipes 14, with the coupling, form the train pipe of a triple valve brake system.

I desire it to be understood that this invention is not to be limited to any particular form or arrangement of parts except in so far as such limitations are specified in the claims.

What I claim as my invention is:

1. In an air brake pipe coupling, the combination of a pair of interlockable coupling members, each having a pair of passages formed therein, an annular channel-shaped coupling ring secured to each coupling and adapted to contact with the ring of the other coupling when said members are joined together to form an annular space and a central passage, one set of passages of said coupling members communicating with the annular space formed by said rings and the other set of passages communicating with the central passage formed by said rings.

2. In an air brake pipe coupling, the combination of a pair of interlockable coupling members, each having a pair of passages formed therein, an annular channel shaped flexible coupling ring, an annular channel-shaped ring fitting within the channel of said flexible coupling ring and bolts securing said coupling ring to its coupling member, said coupling rings adapted to engage each other to form an annular space and a central passage when said coupling members are joined together, one set of passages of said coupling members communicating with said annular space and the other set of passages communicating with said central passage.

3. In an air brake pipe coupling, the combination of a pair of interlockable coupling members, each having a pair of passages formed therein and valve seat formed in said members in one set of passages, an annular channel-shaped coupling ring secured to each coupling member and adapted to engage the ring of the other member to form an annular space communicating with one set of passages and a central space communicating with another set of passages in said members, and spring-closed shut-off valves engageable with said seats in the passages communicating with said central space, having stems projecting into said central space and engageable with each other to open said valves when the coupling members are joined together.

In testimony whereof, I affix my signature.

NIELS A. CHRISTENSEN.